(12) United States Patent
Gazzola et al.

(10) Patent No.: US 10,476,588 B2
(45) Date of Patent: Nov. 12, 2019

(54) AUTOMATIC BANDWIDTH OPTIMIZATION FOR OPTICAL NETWORKS

(71) Applicant: Cisco Technology, Inc., San Jose, CA (US)

(72) Inventors: Maurizio Gazzola, Milan (IT); Stefano Piciaccia, Milan (IT); Lorenzo Ghioni, Casalmaiocco (IT); Ronald Johnson, San Ramon, CA (US); Alberto Arnaldo Tanzi, Trezzano sul naviglio (IT); Sushin Suresan Adackaconam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/952,345

(22) Filed: Apr. 13, 2018

(65) Prior Publication Data

US 2019/0319702 A1   Oct. 17, 2019

(51) Int. Cl.
*H04B 10/075* (2013.01)
*H04B 10/073* (2013.01)
*H04J 14/02* (2006.01)

(52) U.S. Cl.
CPC ......... *H04B 10/075* (2013.01); *H04B 10/073* (2013.01); *H04J 14/0241* (2013.01); *H04J 14/0272* (2013.01)

(58) Field of Classification Search
CPC . H04B 10/073; H04B 10/075; H04J 14/0241; H04J 14/0272
(Continued)

(56) References Cited

U.S. PATENT DOCUMENTS 8,270,831 B2    9/2012   Tanzi et al.
8,295,701 B2   10/2012   Gazzola et al.
(Continued)

FOREIGN PATENT DOCUMENTS

EP    3068063 A2    9/2016
WO   2009100252 A2   8/2009
WO   2017079184 A1   5/2017

OTHER PUBLICATIONS

T V Chabata, et al., "Digital Signal Processing Algorithm for Signal Analysis and Performance Monitoring in an Optical Communication Link", Proceedings of SAIP2013: the 58th Annual Conference of the South African Institute of Physics, Jul. 8-12, 2013, 4 pages.
(Continued)

*Primary Examiner* — Dalzid E Singh
(74) *Attorney, Agent, or Firm* — Edell, Shapiro & Finnan, LLC

(57) ABSTRACT

Techniques for automatic bandwidth optimization of an optical communication channel in an optical network are provided. In one embodiment, a method of automatically optimizing bandwidth includes receiving, at a first optical network element, a first signal transmission transmitted according to a first set of transmission parameters over an optical communication channel established between the first optical network element and a second optical network element. The method includes determining a first quality of signal parameter associated with the first signal transmission and determining whether the first quality of signal parameter is worse than a predetermined quality of signal value. Upon determining that the first quality of signal parameter is not worse than the predetermined value, the method further includes transmitting a second set of transmission parameters to the second optical network element to further
(Continued)

optimize the bandwidth of the optical communication channel.

20 Claims, 4 Drawing Sheets

(58) Field of Classification Search
USPC .......................................................... 398/26
See application file for complete search history.

(56) References Cited

U.S. PATENT DOCUMENTS

| | | |
|---|---|---|
| 8,942,379 B2 | 1/2015 | Loprieno et al. |
| 9,438,369 B2 | 9/2016 | Swinkels et al. |
| 2010/0183308 A1 | 7/2010 | Gerstel et al. |
| 2010/0239259 A1 | 9/2010 | Forghieri et al. |
| 2015/0162980 A1* | 6/2015 | Cavaliere ......... H04B 10/07953 398/26 |
| 2015/0222354 A1* | 8/2015 | Shang ................ H04B 10/0775 398/26 |
| 2016/0050470 A1 | 2/2016 | Swinkels et al. |
| 2016/0173198 A1* | 6/2016 | Harley ................ H04B 10/616 398/26 |
| 2016/0254862 A1* | 9/2016 | Hayashi ........... H04B 10/07953 398/27 |

OTHER PUBLICATIONS

International Search Report and Written Opinion in counterpart International Application No. PCT/US2019/025724 dated Jul. 18, 2019 16 pages.

Slovak, Juraj et al., "Benefits of Performance Awareness in Coherent Dynamic Optical Networks", Optical Fiber Communication Conference, ISBN: 978-1-943580-38-5, Mar. 11, 2018, 3 pages.

* cited by examiner

AUTOMATIC BANDWIDTH OPTIMIZATION FOR OPTICAL NETWORKS

TECHNICAL FIELD

The present disclosure relates to bandwidth optimization of an optical communication channel.

BACKGROUND

Wavelength-division multiplexed (WDM) and dense wavelength-division multiplexed (DWDM) optical networks are optical networks in which optical signals at different wavelengths may be transmitted over a common or shared optical fiber. Each wavelength defines a particular optical communication channel. DWDM optical networks allow for high data rates, multiplexing, switch management, supervision, and survivability of optical channels and signals. Given their high data rates, DWDM optical networks are well suited for applications involving data transmissions across great distances.

DESCRIPTION OF EXAMPLE EMBODIMENTS

Overview

Presented herein are techniques for automatic bandwidth optimization of an optical communication channel. In an example embodiment, a method is provided that includes receiving, at a first optical network element, a first signal transmission over an optical communication channel established between the first optical network element and a second optical network element. The first signal transmission is transmitted according to a first set of transmission parameters. The method includes determining a first quality of signal parameter associated with the first signal transmission and determining whether the first quality of signal parameter is worse than a predetermined quality of signal value Upon determining that the first quality of signal parameter is not worse than the predetermined quality of signal value, the method further includes transmitting a second set of transmission parameters for the optical communication channel from the first optical network element to the second optical network element. The second set of transmission parameters are different than the first set of transmission parameters. The method also includes receiving a second signal transmission over the optical communication channel from the second optical network element according to the second set of transmission parameters.

Example Embodiments

Current advances in digital signal processing (DSP) technology used in WDM/DWDM optical networks provide flexibility in terms of modulation format, type of forward error correction (FEC), and baud rate values. Such flexibility allows different bandwidth availability for each optical communication channel in an optical network. The optical bandwidth will have an effect on the number of optical filters, such as reconfigurable optical add/drop multiplexers (ROADMs), that can be cascaded in an optical line.

The conventional method of designing and optimizing an optical network to have maximum reach versus maximum capacity uses a planning tool having a database with an embedded average value for the measured and guaranteed filter shape of the cascaded ROADMs in the optical line. The resulting parameters define the optimum baud rate/modulation format to cope with such an optical network. In such a network architecture, this average value, however, is by definition a conservative value that is to be guaranteed by the optical network planner/provider.

According to the principles of the example embodiments described herein, techniques for automatic bandwidth optimization of an optical communication channel are provided that optimize the transmission bandwidth against the actual filters deployed in the optical network to provide better performance over conventional methods.

Figure 1:
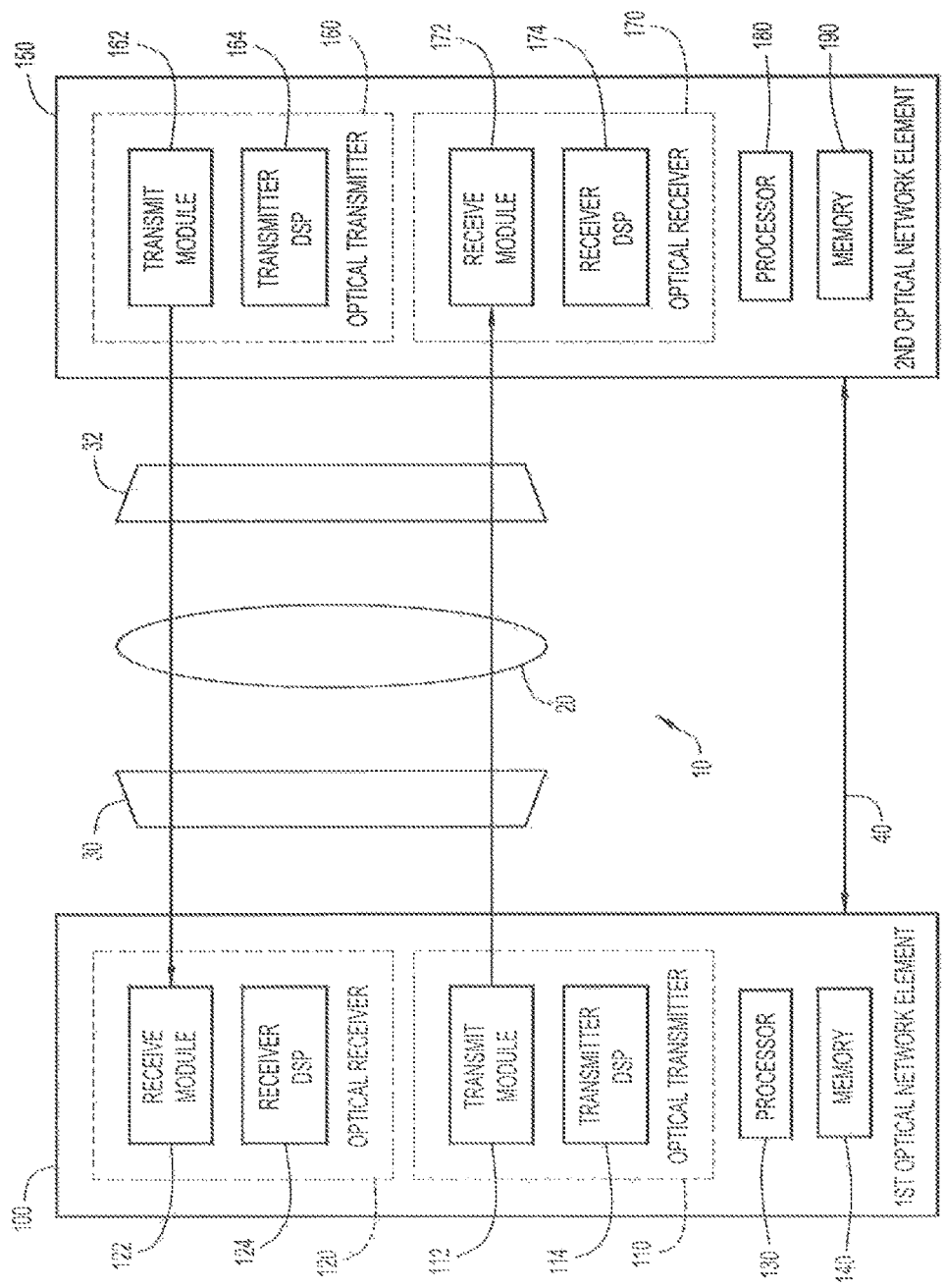
FIG. 1 is a diagram of an optical network in which automatic bandwidth optimization may be implemented, according to an example embodiment.

Referring first to FIG. 1, an optical network 10 is shown in which techniques for automatic bandwidth optimization may be implemented, according to an example embodiment. In an example embodiment, optical network 10 may be a WDM or DWDM optical network. In this embodiment, network 10 may include a plurality of optical network elements, including at least a first optical network element 100 and a second optical network element 150. An optical link or line 20 may be provided between optical network elements, including between first optical network element 100 and second optical network element 150. For example, optical link 20 may include one or more optical fibers between the plurality of optical network elements to provide an optical communication channel between optical network elements. Optical link 20 is configured to facilitate bidirectional communication and signal transmissions between optical network elements of network 10, including between first optical network element 100 and second optical network element 150.

In an example embodiment, network 10 includes at least two optical add/drop multiplexers (OADMs) which may add optical signals, or may drop one or more optical signals before forwarding the optical signal via an optical fiber. In this embodiment, the OADMs may be, for example, reconfigurable OADMS ROADMs, including a first ROADM 30 and a second ROADM 32.

In an example embodiment, each optical network element may include components configured to provide bidirectional communication and signal transmissions over optical link 20. For example, first optical network element 100 may include an optical transmitter 110 configured to transmit signals over one or more optical communication channels of optical link 20 and an optical receiver 120 configured to receive signals over one or more optical communication channels of optical link 20. Optical transmitter 110 may include a transmit module 112 and a transmitter digital signal processor (DSP) 114. Optical receiver 120 may include a receive module 122 and a receiver DSP 124. Transmit module 112 is configured to transmit optical signals and receiver module 122 is configured to receive optical signals. According to one embodiment, transmit module 112 and receiver module 122 may be optical pluggable modules. First optical network element 100 may also include one or more processors 130 and a memory 140.

Second optical network element 150 may include substantially similar components, including an optical transmitter 160 and an optical receiver 170. Optical transmitter 160 may include a transmit module 162 and a transmitter DSP 164. Optical receiver 170 may include a receive module 172 and a receiver DSP 174. Transmit module 162 is configured to transmit optical signals and receiver module 172 is configured to receive optical signals. According to one embodiment, transmit module 162 and receiver module 172 may be optical pluggable modules. Second optical network element 150 may also include one or more processors 180 and a memory 190.

In this embodiment, transmit module 162 of second optical network element 150 is in communication with receive module 122 of first optical network element 100 over an optical communication channel of optical link 20. Similarly, transmit module 112 of first optical network element 100 is in communication with receive module 172 of second optical network element 150 over the optical communication channel of optical link 20. In some embodiments, functions of optical transmitters 110, 160 and optical receivers 120, 170 may be provided by an optical transceiver that is configured to provide both transmitting and receiving functions. In other embodiments, optical transmitters 110, 160 and optical receivers 120, 170 may be separate components in each optical network element.

Additionally, in some embodiments, an out-of-band mechanism may be provided to allow external communication between optical network elements 100, 150 through the optical control plane. In this embodiment, an external channel 40 is provided in network 10 between first optical network element 100 and second optical network element 150 to provide out-of-band communications. In one embodiment, for example, external channel 40 may be by way of a data communication network (DCN).

In first optical network element 100, transmitter DSP 114 is operably coupled to transmit module 112 and may perform various signal processing operations, including changing one or more signal transmission parameters, on optical signals to be transmitted by transmit module 112 of optical transmitter 110. Similarly, receiver DSP 124 is operably coupled to receive module 122 and may perform various signal processing operations to an optical signal transmission received by receive module 122 of optical receiver 120, Second optical network element 150 includes a substantially similar arrangement, with transmitter DSP 164 operably coupled to transmit module 162 and receiver DSP 174 operably coupled to receive module 172. In some embodiments, the functionality of transmitter DSPs 114, 164 may be integrated into the functionality of receiver DSPs 124, 174.

Optical network elements 100, 150 may also include additional components configured to provide control and/or interface functions to optical network elements 100, 150. In an example embodiment, control functions and/or interface functions may be provided by one or more processors 130, 180 included in each of first optical network element 100 and second optical network element 150. For example, changes to one or more signal transmission parameters may be implemented by processors 130, 180 controlling one or more modules of transmitter DSPs 114, 164. Additionally, quality of signal parameters may be determined by processors 130, 180 evaluating information provided by one or more modules of receiver DSPs 124, 174.

The processors 130, 180 may be one or more microprocessors or microcontrollers. The memory 140, 190 may include read only memory (ROM), random access memory (RAM), magnetic, disk storage media devices, optical storage media devices, flash memory devices, electrical, optical, or other physical/tangible memory storage devices. Processors 130, 180 may execute instructions for transmit modules 112, 162, and receive modules 122, 172 which may be stored in memory 140, 190, For example, the processors 130, 180 in optical network elements 100, 150 may be configured to implement the techniques for automatic bandwidth optimization, according to the example embodiments described herein. For example, by adjusting or changing signal transmission parameters associated with signal transmissions from an optical network element and/or by evaluating quality of signal parameters associated with received signals at an optical network element, as will be described in further detail below. A more detailed block diagram of an example optical network element configured to perform the operations described herein is provided below in connection with FIG. 4.

Additionally, forward error correction (FEC) functions may be applied to signal transmissions in optical network 10 by transmitter DSPs 114, 164 and/or receiver DSPs 124, 174 associated with each of optical network elements 100, 150. FEC is a mathematical method by which data is encoded in such a way that at the receiving end, the errors are detected and possibly corrected. To implement FEC in an optical network, extra information is included within a signal transmission to provide redundancy for correcting up to a specified amount of bit errors in the signal. The maximum percentage of errors of missing bits in a signal that can be corrected is determined by the type of FEC used. FEC may be applied to signal transmissions in each optical network element 100, 150 by an FEC encoder associated with the transmitter DSPs 114, 164 of optical transmitters 110, 160 in each optical network element 100 and 150. The FEC encoder may be provided in software, for example which is executed by a processor (e.g., one or more processors 130, 180) of optical network elements 100, 150, in hardware components of optical network elements 100, 150, such as an integrated circuit, or by a combination of software and hardware in each optical network element 100, 150. Likewise, there is an FEC decoder associated with receiver DSPs 124, 174 of optical receivers 120, 170 in each optical network element 100 and 150.

Optical network 10 may include additional components not shown in FIG. 1. For example, optical network 10 may typically include optical fibers and other optical equipment, such as, but not limited to amplifiers, multiplexers, switches, optical regenerators, etc. In the embodiment shown in FIG. 1, multiplexers used in optical network 10 include at least two ROADMs, for example, first ROADM 30 and second ROADM 32. It should be understood, however, that network 10 may include additional numbers of multiplexers, including additional OADMs and/or ROADMs. Optical network 10 may also include a network controller that may be used by a network planner to control and command various components of optical network 10 and establish initial parameters, such as initial signal transmission parameters, for optical network 10.

According to the principles of the embodiments described herein, signal transmissions between first optical network element 100 and second optical network element 150 in optical network 10 will cross two or more optical filtering elements, such as ROADMs (e.g., first ROADM 30 and second ROADM 32) and the resulting bandwidth has a statistical nature that may be optimized based on feedback from DSP.

Figure 2:
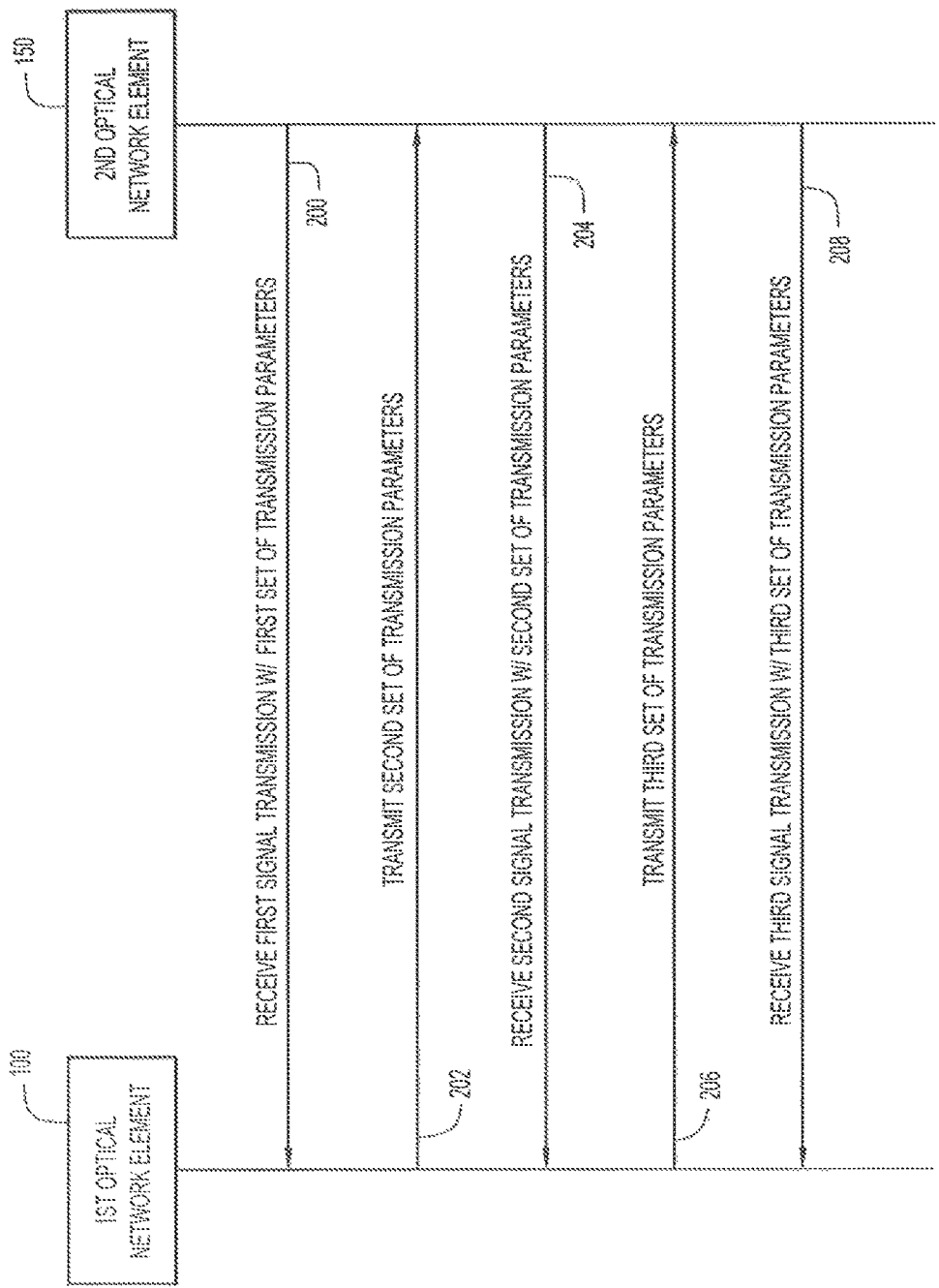
FIG. 2 is a sequence diagram showing operations performed by two optical network elements to implement automatic bandwidth optimization, according to an example embodiment.

Referring now to FIG. 2, operations performed by two optical network elements to implement automatic bandwidth optimization are illustrated, according to an example embodiment. Initially, an optical communication channel of an optical network may be established between two optical network elements. Reference is also made to FIG. 1 for purposes of the description of FIG. 3., An optical communication channel over optical link 20 between first optical network element 100 and second optical network element 150 of network 10 may be established. In an example embodiment, the optical communication channel may be configured for transmitting data or frames at up to 100 gigabits per second (100 G). In other embodiments, the optical communication channel may be configured for higher or lower speeds.

Upon establishing the optical communication channel between first optical network element 100 and second optical network element 150, an initial set of signal transmission parameters, including an initial bandwidth value and/or an initial modulation format, will be set. For example, the initial set of signal transmission parameters may be established by a network controller of network 10 based on a predetermined safe or average value for optical network 10. These initial set of signal transmission parameters may be associated with a preset optical signal-to-noise ratio (OSNR) margin for the optical communication channel.

Rather than using the preset OSNR margin to optimize the channel capacity, the automatic bandwidth optimization techniques of the example embodiments change one or more signal transmission parameters, such as baud rate, modulation format, and/or FEC overhead value, and determine a real-time quality of signal parameter associated with the changed signal transmission parameters, while maintaining the preset OSNR margin. For example, the quality of signal parameter may be one or more of the OSNR value, a Q factor, a bit-error rate (BER) value, and/or a generalized mutual information (GMI) value.

In this embodiment, first optical network element 100 receives a first signal transmission associated with a first set of transmission parameters at a first step 200. The first signal transmission may be sent, for example, from second optical network element 150. In some cases, the first signal transmission may be sent according to the initial set of signal transmission parameters that were set when the optical communication channel between first optical network element 100 and second optical network element 150 was established. In such cases, the first set of transmission parameters for the first signal transmission will be the initial set of signal transmission parameters.

Upon receiving the first signal transmission at first step 200, first optical network element 100 determines whether a quality of signal parameter associated with the first signal transmission is worse than a predetermined quality of signal value. If the quality of signal parameter is not worse than the predetermined quality of signal value, then first optical network element 100 automatically changes one or more of the transmission parameters to optimize bandwidth of signal transmissions and generates a second set of transmission parameters. At a second step 202, first optical network element 100 transmits these second set of transmission parameters to second optical network element 150. Upon receiving the second set of transmission parameters from first optical network element 100, second optical network element 150 may make changes to its components, such as a processor, an FEC encoder, optical transmitter 160, and/or optical receiver 170, to implement the changes to the signal transmission parameters in accordance with the second set of transmission parameters sent by first optical network element 100.

In this embodiment, first optical network element 100 and second optical network element 150 are configured to communicate information associated with the signal transmission parameters in-hand. To facilitate this communication between the optical network elements, each of first optical network element 100 and second optical network element 150 may be configured to send and receive control messages regarding the signal transmission parameters to be used for transmitting signals on the optical communication channel of optical link 20. For example, the control messages may be embedded within the optical signal transmissions sent on the optical communication channel (e.g., a general communication channel (GCC)). In one example, the control messages may be included in free FEC overhead bytes. In another example where an Optical Transport Network (OTN) frame is used, the control messages may be included in customized bytes of the overhead. In other words, a separate and/or distinct communication "back-channel" or other out-of-band communication interface is not needed to communicate the signal transmission parameters between the various optical network elements in optical network 10. With this arrangement, existing optical communication channels may be used to implement the automatic bandwidth optimization techniques of the example embodiments.

In another embodiment, an out-of-band communication interface, for example, external channel 40, may be used to send control messages between optical network elements in optical network 10. In various embodiments, a combination of in-band and out-of-band mechanisms may be used to perform message exchange between the optical network elements in optical network 10.

Next, at a third step 204, first optical network element 100 receives a second signal transmission from second network element 150. This second signal transmission is associated with the second set of transmission parameters that were sent to second optical network element 150 at second step 202. Upon receiving the second signal transmission at third step 204, first optical network element 100 determines whether a quality of signal parameter associated with the second signal transmission is worse than the predetermined quality of signal value. If the quality of signal parameter is still not worse than the predetermined quality of signal value, then first optical network element 100 again changes one or more of the transmission parameters to further optimize bandwidth of signal transmissions and generates a third set of transmission parameters. At a fourth step 206, first optical network element 100 transmits the third set of transmission parameters to second optical network element 150, Upon receiving the third set of transmission parameters from first optical network element 100, second optical network element 150 may make changes to its components, as described above, to implement the changes to the signal transmission parameters in accordance with the third set of transmission parameters sent by first optical network element 100.

After making the changes to implement the third set of transmission parameters, second optical network 150 sends a third signal transmission associated with the third set of transmission parameters, which is received by first optical network element 100 at a fifth step 208. The automatic bandwidth optimization techniques according to the example embodiments may continue further iterations of these operations until first optical network element 100 determines that the latest quality of signal parameter is worse than the predetermined quality of signal value. With this arrangement, the bandwidth on the optical communication channel of optical line 20 between first network element 100 and second optical network element 150 in optical network 10 may be optimized in a step-wise manner.

Figure 3:
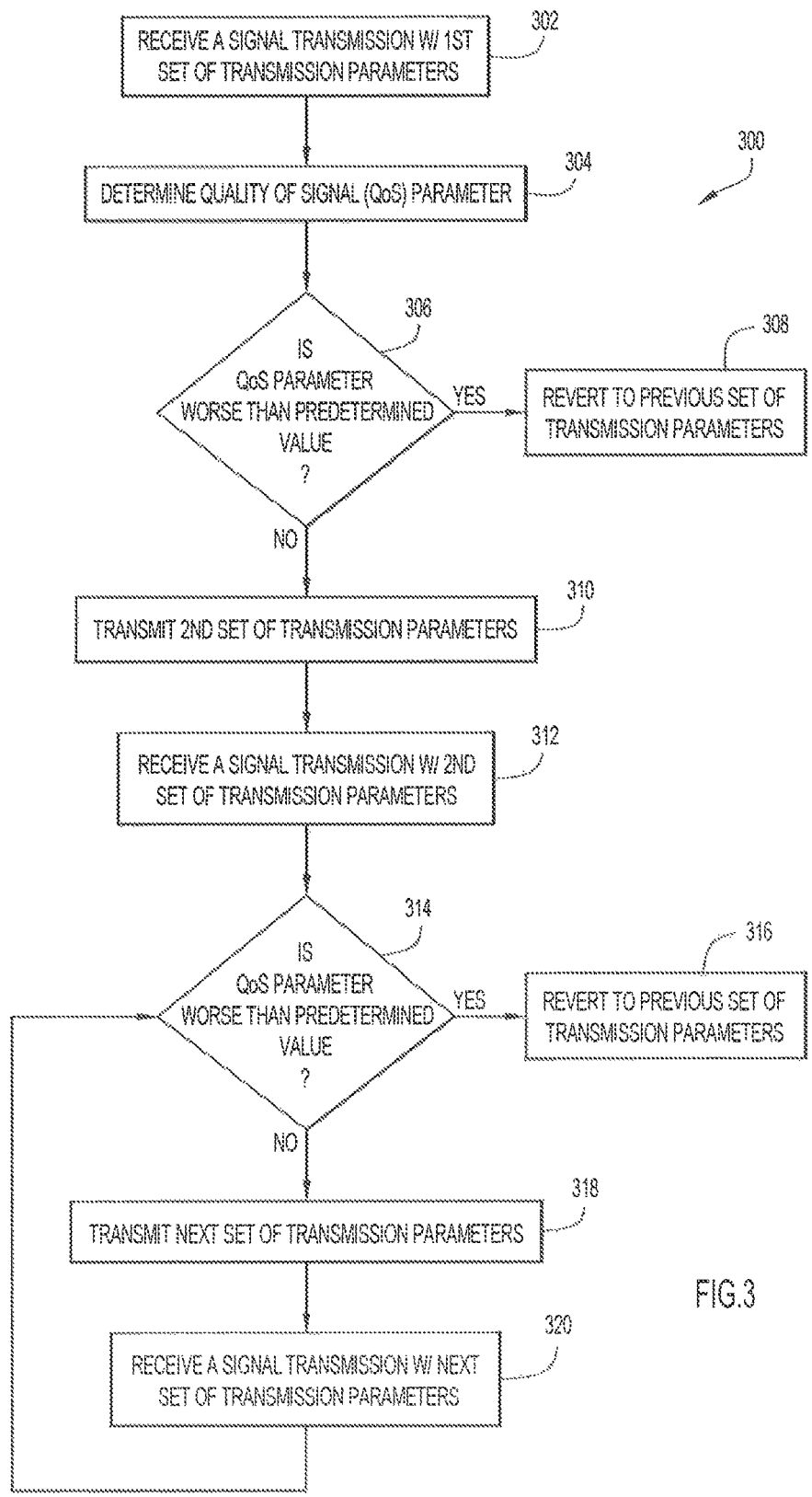
FIG. 3 is a flowchart depicting a method for automatic bandwidth optimization, according to an example embodiment.

FIG. 3 illustrates a flowchart of a method 300 for automatic bandwidth optimization of an optical communication channel, according to an example embodiment. Method 300 for automatic bandwidth optimization may be implemented by an optical network element in an optical network. For example, method 300 may be implemented by first optical network element 100 in optical network 10 to automatically optimize the bandwidth of the optical communication channel between first optical network element 100 and second optical network element 150 on optical line 20 (shown in FIG. 1).

In this embodiment, method 300 may begin at an operation 302 where a first signal transmission over an optical communication channel is received at an optical network element. The first signal transmission received at operation 302 may be associated with a first set of transmission parameters that were used to transmit the signal from another optical network element in the optical network. For example, second optical network element 150 may send a first signal transmission to first optical network element 100 using the first set of transmission parameters.

As noted above, in some cases, the first set of transmission parameters may be an initial set of signal transmission parameters established by a network controller or network planner as preset average values for signal transmissions over optical communication channels in the optical network. These initial set of signal transmission parameters may be selected to have a minimum guaranteed bandwidth and may be associated with an OSNR margin.

The principles of the present embodiments described herein provide techniques to optimize bandwidth of an optical communication channel by changing the signal transmission parameters from the average values of the initial set of signal transmission parameters to optimized values that take advantage of the specific capacity of the optical communication channel that has been established between optical network elements.

Transmission parameters that may be changed include one or more of baud rate value, type of modulation, and/or FEC overhead value. Baud rate refers to the number of signal or symbol changes that occur per second. By increasing or decreasing the baud rate value of a signal transmission, a corresponding increase or decrease in the bandwidth of the signal may be generated.

Different modulation types or formats may also be used for signal transmissions on an optical communication channel. For example, modulation types or formats may include Binary Phase Shift Keying (BPSK) techniques, a variety of different Quadrature Amplitude Modulation (QAM) techniques, such as 8-QAM, 16-QAM 32-QAM, 64-QAM, and/or hybrid modulation techniques with a granularity up to 0.125 bit/s. Each modulation type is configured to allow for different amounts of bits per symbol to be transmitted in a given signal transmission, depending on the modulation type chosen. For example, increasing orders of QAM modulation types, such as 8-QAM, 16-QAM, 32-QAM, 64-QAM, allow for the transmission of more bits per symbol, however, with lesser reliability, i.e., with a higher bit-error rate (BER). Accordingly, selecting one modulation type over another for a signal transmission may increase or decrease bandwidth on the optical communication channel with a related corresponding increase or decrease in the signal quality.

Additionally, signal transmission parameters may also include changes to FEC overhead values. As described above, FEC is an error correction encoding technique where extra information is included with a signal transmission to provide redundancy for correcting up to a specified amount of bit errors in the signal. However, this extra information uses some of the available bandwidth that could otherwise be used to transmit data. The amount of extra information included in the signal transmission may be expressed in terms of an FEC overhead value. The FEC overhead value is a percentage that represents the amount of extra information included in the signal, where a higher FEC overhead value indicates more extra information is included in the signal with a corresponding less amount of bandwidth available for the remaining signal.

Next, at an operation 304, a quality of signal (QoS) parameter is determined. QoS parameters may be used to determine how many errors are present in the signal transmission. QoS parameters may include bit error rate (BER), optical signal-to-noise ratio (OSNR), generalized mutual information (GMI), or other acceptable quality measurement values, as well as a combination of different signal quality parameters.

At an operation 306, the determined QoS parameter from operation 304 is compared to a predetermined quality of signal value. In some embodiments, the predetermined QoS value may be an OSNR margin associated with the optical communication channel when the channel is established. For example, as described above a preset OSNR margin may be established by a network controller or network planner. The predetermined QoS value may also be a preset BER value, above which signal transmissions are deemed to be too noisy or unreliable. In other embodiments, the predetermined QoS value may be a calculated value based on a particular optical network architecture or a desired level of service.

If at operation 306, the determined QoS parameter from operation 304 is worse than the predetermined QoS value, then method 300 advances to an operation 308 where the signal transmission parameters are reverted to a previous set of transmission parameters. For example, at operation 308, method 300 may include reverting to the last set of transmission parameters that were associated with a QoS parameter that was not worse than the predetermined QoS value. In other cases, at operation 308, method 300 may include changing the signal transmission parameters to a new set of transmission parameters that are configured to improve error rates and re-evaluating whether the new set of transmission parameters result in a QoS parameter that is worse than the predetermined QoS value.

If at operation 306, the determined QoS parameter from operation 304 is not worse than the predetermined QoS value, there is potential for the optical network element to make further changes to one or more of the signal transmission parameters to attempt to further optimize the bandwidth on the optical communication channel. Accordingly, a second set of transmission parameters are generated to further optimize the bandwidth of the optical communication channel. Next, method 300 advances to an operation 310 where the second set of transmission parameters are transmitted from the optical network element making the changes (e.g., first optical network element 100) to the other optical network element (e.g., second optical network element 150) on the optical communication channel.

Once the second set of transmission parameters are received by the other optical network element and the changes implemented, a new signal transmission may be received by the optical network element at an operation 312, This new signal transmission is associated with the second set of transmission parameters that were communicated to the other optical network element at operation 310. Next, at an operation 314, a QoS parameter is determined for this new signal transmission in accordance with the second set of transmission parameters and compared to the predetermined QoS value.

If at operation 314, the determined QoS, parameter for the new signal transmission according to the second set of transmission parameters is worse than the predetermined QoS value, then method 300 advances to an operation 316 where the signal transmission parameters are reverted to a previous set of transmission parameters, as described above for operation 308.

If at operation 314, the determined QoS parameter for the new signal transmission according to the second set of transmission parameters is not worse than the predetermined QoS value, there is still more potential for the optical network element to make additional changes to one or more of the signal transmission parameters to attempt to further optimize the bandwidth on the optical communication channel. Accordingly, a next set of transmission parameters are generated to further optimize the bandwidth of the optical communication channel. Next, method 300 advances to an operation 318 where the next set of transmission parameters are transmitted from the optical network element making the changes (e.g., first optical network element 100) to the other optical network element (e.g., second optical network element 150) on the optical communication channel.

A next signal transmission is received at an operation 320 in accordance with the next set of transmission parameters transmitted at operation 318. Method 300 may then return to operation 314 where the QoS parameter is determined for this next signal transmission with the next set of transmission parameters and compared to the predetermined QoS value. In an exemplary embodiment, method 300 may include one or more repeated sequences of operations 314, 316, 318, 320 in an iterative manner until an optimized bandwidth for the optical communication channel is reached within the predetermined QoS value. With this arrangement, method 300 may be used by an optical network element to automatically optimize bandwidth of an optical communication channel.

According to the example embodiments, bandwidth on an optical communication channel may automatically be optimized. It should be understood that optimizing bandwidth may take different forms, depending on the circumstances. For example, in some situations, optimizing bandwidth may include maximizing the amount of bandwidth capacity that is available on a given optical communication channel. In other situations, optimizing bandwidth may include minimizing the amount of spectrum used on a given optical communication channel so that additional capacity may be available over an optical line for other optical communication channels. The principles of the embodiments described herein, therefore, provide techniques for automatically optimizing bandwidth that may be used in a variety of circumstances.

Techniques for automatic bandwidth optimization according to the principles of the example embodiments described herein may be explained with reference to the following two scenarios. Under a first scenario, the trade-off between distance and capacity in an optical communication channel is optimized. In other words, in a typical situation, the further the distance between two optical network elements, the less capacity that is available for the optical communication channel. Likewise, providing a greater capacity for the optical communication channel results in less distance that a signal can be transmitted on that channel without significant errors. In this scenario, the techniques of automatically optimizing the bandwidth according to the example embodiments may be implemented to maximize the throughput of the optical communication channel.

In an example under this scenario, new sets of signal transmission parameters may be configured to increase the bandwidth for signal transmission and/or increase FEC overhead value to increase distance. For example, operations of method 300 may be implemented repeatedly as described above to generate step increases in one or more of the signal transmission parameters configured to maximize the bandwidth of the optical communication channel until reaching the limit of acceptable errors, which, for example, may be reflected in the predetermined QoS value.

It should be understood that changes may be made to one or more of the signal transmission parameters, including baud rate value, type of modulation, and/or FEC overhead value to maximize the bandwidth. Additionally, changes may be made to multiple parameters in coordination with each other to provide complementary effects. For example, in one embodiment, a modulation type may be changed to increase bandwidth, such as changing the modulation type from 16-QAM to 64-QAM. However, such a change may also increase the number of errors in the signal transmission. Accordingly, an FEC overhead value may also be increased along with the change in the modulation type to attempt to correct for a greater percentage of errors in the signal transmission. Other combinations of changes to baud rate value, type of modulation, and/or FEC overhead value may be made in new sets of signal transmission parameters to maximize the bandwidth in similar scenarios.

Under a second scenario, a wavelength or frequency may be preset or established for an optical communication channel, for example, due to physical limitations in the optical network or a fixed optical channel width. In this scenario, the techniques of automatically optimizing the bandwidth according to the example embodiments may be implemented to minimize the amount of spectrum used on the optical communication channel so that additional capacity may be available over the optical line for other optical communication channels.

In an example under this scenario, new sets of signal transmission parameters may be configured to decrease the bandwidth for signal transmission and/or decrease FEC overhead value to minimize the amount of additional capacity used to transmit the signal over the optical communication channel. For example, operations of method 300 may be implemented repeatedly as described above to generate step decreases in one or more of the signal transmission parameters configured to minimize the amount of spectrum used by the optical communication channel until reaching the limit of acceptable errors, which, for example, may be reflected in the predetermined QoS value. In one example embodiment, each new set of signal transmission parameters may include step-wise decrease in FEC overhead value until reaching the limit of acceptable errors, such as a BER value.

As with the first scenario, it should be understood that changes may be made to one or more of the signal transmission parameters, including baud rate value, type of modulation, and/or FEC overhead value to minimize the spectrum used. Additionally, changes may be made to multiple parameters in coordination with each other to provide complementary effects.

According to the principles of the embodiments described herein, the described techniques may be applied to dynamically optimize an optical communication channel in an optical network for a defined objective function. A user can define a variety of different objective functions for a given underlying optical network having two or more ROADMs. For example, some possible defined objective functions may include maximizing a line rate for a minimum performance margin, maximizing a performance margin for a defined line rate, or, for a specified maximum baud rate, determining a maximum line rate while meeting a minimum performance margin.

According to one example, the techniques of the present embodiments may be applied to maximize a line rate for a minimum defined performance margin. In this example, the signal transmission parameters may be set to the best performing modulation format (i.e., type of modulation) and the baud rate value may be changed from a lowest value to a highest value while capturing or determining the resulting quality of signal parameters for each value (i.e., OSNR value, Q factor, pre-FEC BER, and/or GMI). Based on the quality of signal parameters, the maximum baud rate value that is above a minimum defined performance margin (i.e., predetermined quality of signal value) is identified.

Next, the baud rate value may be adjusted (e.g., +/− ve adjustments) and +/− ve changes to bits/symbol may be made while capturing or determining the resulting quality of signal parameters for each adjustment (i.e., OSNR value, Q factor, pre-FEC BER, and/or GMI). From this information, the global maxima of line rate (i.e., baud rate value) bits-symbol 2-tuple that satisfies the minimum defined performance margin (i.e., predetermined quality of signal value) can be determined. These steps may be repeated using different FEC coding options (e.g., FEC overhead values) to determine a 3-tuple (e.g., FEC overhead value, bits, symbol) that provides an absolute maximum line rate for the optical communication channel.

According to another example, the techniques of the present embodiments may be applied to maximize a performance margin for a defined line rate. In this example, the signal transmission parameters may be set to the best performing modulation format (i.e., type of modulation) and the baud rate value may be changed from a lowest value to a highest value while capturing or determining the resulting quality of signal parameters for each value (i.e., OSNR value, Q factor, pre-FEC BER, and/or GMI). Based on the quality of signal parameters, the maximum baud rate value that is above a minimum defined performance margin (i.e., predetermined quality of signal value) is identified, as in the previous example.

Next, the baud rate value may be adjusted (e.g., +/− ve adjustments) to identify the corresponding bits/symbol that satisfy the defined line rate target value. From this information, the global maxima of quality of signal parameter (i.e., OSNR value, Q factor, pre-FEC BER, and/or GMI) can be determined for the baud rate value bits-symbol 2-tuple. These steps may be repeated using different FEC coding options (e.g., FEC overhead values) to determine a 3-tuple (e.g., FEC overhead value, bits, symbol) that provides an absolute maximum performance margin (e.g., quality of signal parameter) for the optical communication channel.

According to still another example, the techniques of the present embodiments may be applied to, given a specified maximum baud rate, determine a maximum line rate while meeting a minimum performance margin. In this example, the baud rate value of the signal transmission parameters may be adjusted starting at the defined or specified maximum baud rate value with − ve adjustments and +/− ve changes to bits/symbol while capturing or determining the resulting quality of signal parameters (i.e., OSNR value, Q factor, pre-FEC BER, and/or GMI) for baud rate value bits-symbol 2-tuple. From this information, the maxima of line rate (i.e., baud rate value + bits/symbol) can be determined for a range of performance margin values equal to or above the minimum performance margin (e.g., predetermined quality of signal value). These steps may be repeated using different FEC coding options (e.g., FEC overhead values) to determine a 3-tuple (e.g., FEC overhead value, bits, symbol) that provides an absolute maximum line rate for the optical communication channel.

Figure 4:
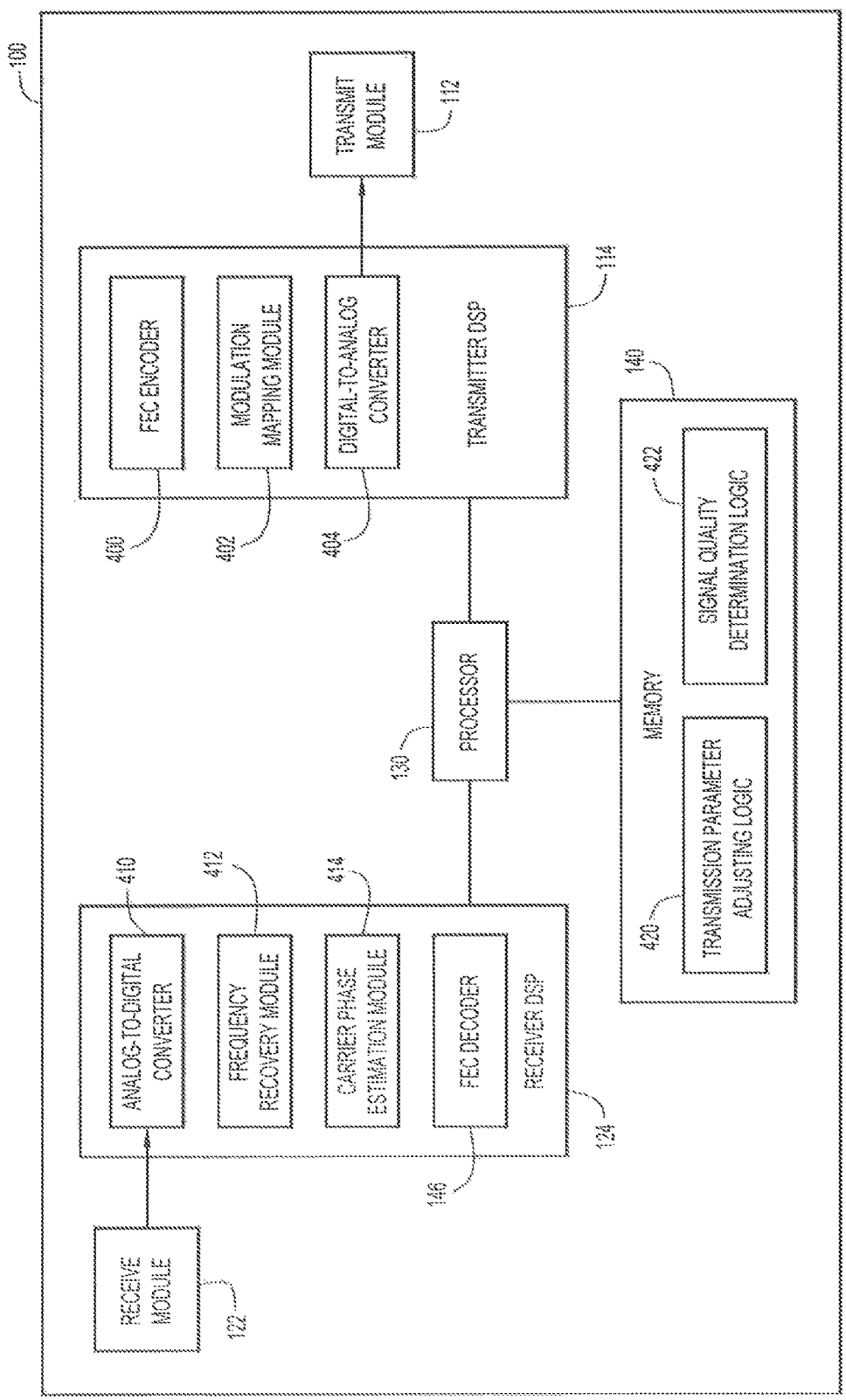
FIG. 4 is a block diagram of an optical network element configured to implement automatic bandwidth optimization, according to an example embodiment.

Referring now to FIG. 4, a block diagram is shown of an optical network element, for example, first optical network element 100, that is configured to implement techniques for automatically optimizing bandwidth of an optical communication channel. In this embodiment, first optical network element 100 includes transmit module 112 and transmitter DSP 114 of optical transmitter 110, receive module 122 and receiver DSP 124 of optical receiver 120, processor 130 for processing information, and memory 140, as described above in reference to FIG. 1.

As shown in FIG. 4, each of transmitter DSP 114 and receiver DSP 124 may include a number of modules configured to implement various functions associated with optical transmitter 110 and optical receiver 120 of first optical network element 100. In this embodiment, transmitter DSP 114 includes an FEC encoder module 400, a modulation or constellation mapping module 402, and a Digital-to-Analog Converter DAC module 404. Receiver DSP 124 includes an Analog-to-Digital Converter ADC module 410, a frequency recovery module 412, a carrier phase estimation module 414, and FEC decoder module 416.

The modules of transmitter DSP 114 and/or receiver DSP 124 may be implemented by firmware (fixed or programmable digital logic) or any other suitable DSP implementation now known or hereinafter developed. Alternatively, the modules of transmitter DSP 114 and/or receiver DSP 124 may be implemented by software instructions stored in memory 140 that are executed by one or processors 130.

On the receiving side, receive module 122 receives an optical signal transmission and generates an uncompensated optical receive signal that is sent to ADC module 410. ADC module converts the analog signal to a digital signal before forwarding the signal to frequency recovery module 412. Frequency recovery module 412 is configured to recover the carrier frequency associated with the received optical signal transmission and forward the recovered carrier frequency to FEC decoder module 416 to correct coding errors in the signal.

On the transmitting side, transmitter DSP 114 receives a digital transmit signal to be transmitted and processes the signal before forwarding it to transmit module 112 that generates the optical signal transmission to be sent over the optical communication channel of optical link 20. Accordingly, FEC encoder module 400 receives the digital transmit signal and FEC-encodes it to allow a receiver DSP (for example, receiver DSP 174 of second optical network element 150) to correct for transmission errors. FEC encoder module 400 forwards the FEC-encoded signal to modulation mapping module 402. Modulation mapping module 402 may determine in-phase (I) and quadrature (Q) symbol data for one or more information bits. Modulation mapping module 402 forwards the I and Q symbol data streams to DAC module 404, which converts each of the one or more I and Q symbols to analog values corresponding to the phase and amplitude of the one or more I and Q symbols. DAC module 404 may send a signal that includes the analog values corresponding to the phase and amplitude of the one or more I and Q symbols to transmit module 112. Transmit module 112 converts these analog values to the optical signal transmission that is transmitted to the far-end optical network element second optical network element 150).

First optical network element 100 may further include a bus (not shown) or other communication mechanism coupled with processor 130 for communicating the information between components of first optical network element 100. While the figure shows a single block 130 for a processor, it should be understood that the processor 130 may represent a plurality of processing cores, each of which can perform separate processing.

Optical transmitter 110 and optical receiver 120 are configured to provide first optical network element 100 with signal transmitting and receiving capabilities, as described above in reference to FIG. 1. In addition, in some embodiments, each of the functions of optical transmitter 110 and optical receiver 120 may be provided by a transceiver configure to provide both transmitting and receiving functions in a single component.

The memory 140 of first optical network element 100 may be read only memory (ROM), random access memory (RAM), magnetic disk storage media devices, optical storage media devices, flash memory devices, electrical, optical, or other physical/tangible memory storage devices. Thus, in general, the memory 140 may comprise one or more tangible (non-transitory) computer readable storage media (e.g., a memory device) encoded with software comprising computer executable instructions and when the software is executed (by the processor 130) it is operable to perform the operations described herein. For example, one or more of transmission parameter adjusting logic 420 and signal quality determination logic 422 is stored in memory 140 for providing one or more of the functions of first optical network element 100 described herein. In particular, transmission parameter adjusting logic 420 may cause first optical network element 100 to implement changes to the signal transmission parameters and associated operations described above in connection with FIGS. 2 and 3 above when executed by processor 130 from memory 140. Similarly, signal quality determination logic 422 may cause first optical network element 100 to perform operations including determining QoS parameters for a signal transmission and comparing the QoS parameters to predetermined QoS values described above in connection with FIG. 3 above when executed by processor 130 from memory 140. In addition, memory 140 may be used for storing temporary variables or other intermediate information during the execution of instructions by processor 130.

According to the principles of the example embodiments described herein, techniques for automatic bandwidth optimization of an optical communication channel are provided that optimize the transmission bandwidth against the actual filters deployed in the optical network to provide better performance over conventional methods.

The principles of the present embodiments described herein provide techniques to optimize bandwidth of an optical communication channel by changing the signal transmission parameters from the average values of the initial set of signal transmission parameters to optimized values that take advantage of the specific capacity of the optical communication channel that has been established between optical network elements.

In summary, a method is provided comprising: receiving, at a first optical network element, a first signal transmission over an optical communication channel established between the first optical network element and a second optical network element, wherein the first signal transmission is transmitted according to a first set of transmission parameters; determining a first quality of signal parameter associated with the first signal transmission; determining whether the first quality of signal parameter is worse than a predetermined quality of signal value; upon determining that the first quality of signal parameter is not worse than the predetermined quality of signal value, transmitting a second set of transmission parameters for the optical communication channel from the first optical network element to the second optical network element, wherein the second set of transmission parameters are different than the first set of transmission parameters; and receiving a second signal transmission over the optical communication channel from the second optical network element according to the second set of transmission parameters.

In another form, one or more non-transitory computer readable storage media encoded with instructions that, when executed by a processor, cause the processor to perform operations comprising: receiving, at a first optical network element, a first signal transmission over an optical communication channel established between the first optical network element and a second optical network element, wherein the first signal transmission is transmitted according to a first set of transmission parameters; determining a first quality of signal parameter associated with the first signal transmission; determining whether the first quality of signal parameter is worse than a predetermined quality of signal value; upon determining that the first quality of signal parameter is not worse than the predetermined quality of signal value, transmitting a second set of transmission parameters for the optical communication channel from the first optical network element to the second optical network element, wherein the second set of transmission parameters are different than the first set of transmission parameters; and receiving a second signal transmission over the optical communication channel from the second optical network element according to the second set of transmission parameters.

In addition, an apparatus is provided comprising: an optical transceiver configured to transmit and receive signal transmissions over an optical communication channel established with at least one optical network element; and at least one processor coupled with the optical transceiver, and configured to: receive a first signal transmission over the optical communication channel from the at least one optical network element, wherein the first signal transmission is transmitted according to a first set of transmission parameters; determine a first quality of signal parameter associated with the first signal transmission; determine whether the first quality of signal parameter is worse than a predetermined quality of signal value; upon determining that the first quality of signal parameter is not worse than the predetermined quality of signal value, transmit a second set of transmission parameters for the optical communication channel to the at least one optical network element, wherein the second set of transmission parameters are different than the first set of transmission parameters; and receive a second signal transmission over the optical communication channel from the at least one optical network element according to the second set of transmission parameters.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method, comprising:
   receiving, at a first optical network element, a first signal transmission over an optical communication channel established between the first optical network element and a second optical network element, wherein the first signal transmission is transmitted according to a first set of transmission parameters;
   determining a first quality of signal parameter associated with the first signal transmission;
   determining whether the first quality of signal parameter is worse than a predetermined quality of signal value;
   upon determining that the first quality of signal parameter is not worse than the predetermined quality of signal value, transmitting a second set of transmission parameters for the optical communication channel from the first optical network element to the second optical network element, wherein the second set of transmission parameters are different than the first set of transmission parameters;
   receiving a second signal transmission over the optical communication channel from the second optical network element according to the second set of transmission parameters; and
   determining a second quality of signal parameter associated with the second signal transmission, the first set of transmission parameters and the second set of transmission parameters are different from the first quality of signal parameters and the second quality of signal parameters.

2. The method of claim 1, further comprising:
   determining whether the second quality of signal parameter is worse than the predetermined quality of signal value; and
   upon determining that the second quality of signal parameter is not worse than the predetermined quality of signal value, transmitting a third set of transmission parameters from the first optical network element to the second optical network element, wherein the third set of transmission parameters are different than the first set of transmission parameters and the second set of transmission parameters.

3. The method of claim 2, wherein upon determining that the second quality of signal parameter is worse than the predetermined quality of signal value, re-transmitting the second set of transmission parameters from the first optical network element to the second optical network element for subsequent signal transmissions over the optical communication channel.

4. The method of claim 1, wherein the first set of transmission parameters includes one or more of a baud rate value, a modulation type, and a forward error correction (FEC) overhead value; and wherein the second set of transmission parameters includes at least one different baud rate value, modulation type, or FEC overhead value than the first set of transmission parameters.

5. The method of claim 1, wherein the predetermined quality of signal value is at least one of an optical signal-to-noise ratio (OSNR) value, a Q factor, a bit error rate (BER) value, or a generalized mutual information (GMI) value.

6. The method of claim 1, wherein the optical communication channel is associated with a fixed frequency; and wherein the second set of transmission parameters for the optical communication channel are configured to minimize an amount of bandwidth used on the optical communication channel.

7. The method of claim 1, wherein the first set of transmission parameters are configured to provide a first bandwidth value for the optical communication channel; and wherein the second set of transmission parameters are configured to provide a second bandwidth value for the optical communication channel, wherein the second bandwidth value is larger than the first bandwidth value.

8. A non-transitory computer readable storage media encoded with instructions that, when executed by a processor, cause the processor to perform operations comprising:
   receiving, at a first optical network element, a first signal transmission over an optical communication channel established between the first optical network element and a second optical network element, wherein the first signal transmission is transmitted according to a first set of transmission parameters;
   determining a first quality of signal parameter associated with the first signal transmission;
   determining whether the first quality of signal parameter is worse than a predetermined quality of signal value;
   upon determining that the first quality of signal parameter is not worse than the predetermined quality of signal value, transmitting a second set of transmission parameters for the optical communication channel from the first optical network element to the second optical network element, wherein the second set of transmission parameters are different than the first set of transmission parameters;
   receiving a second signal transmission over the optical communication channel from the second optical network element according to the second set of transmission parameters; and
   determining a second quality of signal parameter associated with the second signal transmission, the first set of transmission parameters and the second set of transmission parameters are different from the first quality of signal parameters and the second quality of signal parameters.

9. The non-transitory computer readable storage media of claim 8, wherein the instructions further cause the processor to perform operations comprising:
   determining whether the second quality of signal parameter is worse than the predetermined quality of signal value; and
   upon determining that the second quality of signal parameter is not worse than the predetermined quality of signal value, transmitting a third set of transmission parameters from the first optical network element to the second optical network element, wherein the third set of transmission parameters are different than the first set of transmission parameters and the second set of transmission parameters.

10. The non-transitory computer readable storage media of claim 9, wherein the instructions further cause the processor to perform operations comprising:
    upon determining that the second quality of signal parameter is worse than the predetermined quality of signal value, re-transmitting the second set of transmission parameters from the first optical network element to the second optical network element for subsequent signal transmissions over the optical communication channel.

11. The non-transitory computer readable storage media of claim 8, wherein the first set of transmission parameters includes one or more of a baud rate value, a modulation type, and a forward error correction (FEC) overhead value; and wherein the second set of transmission parameters includes at least one different baud rate value, modulation type, or FEC overhead value than the first set of transmission parameters.

12. The non-transitory computer readable storage media of claim 8, wherein the predetermined quality of signal value is at least one of an optical signal-to-noise ratio (OSNR) value, a Q factor, a bit error rate (BER) value, or a generalized mutual information (GMI) value.

13. The non-transitory computer readable storage media of claim 8, wherein the optical communication channel is associated with a fixed frequency; and wherein the second set of transmission parameters for the optical communication channel are configured to minimize an amount of bandwidth used on the optical communication channel.

14. The non-transitory computer readable storage media of claim 8, wherein the first set of transmission parameters are configured to provide a first bandwidth value for the optical communication channel; and wherein the second set of transmission parameters are configured to provide a second bandwidth value for the optical communication channel, wherein the second bandwidth value is larger than the first bandwidth value.

15. An apparatus comprising:
an optical transceiver configured to transmit and receive signal transmissions over an optical communication channel established with at least one optical network element; and
at least one processor coupled with the optical transceiver, and configured to:
receive a first signal transmission over the optical communication channel from the at least one optical network element, wherein the first signal transmission is transmitted according to a first set of transmission parameters;
determine a first quality of signal parameter associated with the first signal transmission;
determine whether the first quality of signal parameter is worse than a predetermined quality of signal value;
upon determining that the first quality of signal parameter is not worse than the predetermined quality of signal value, transmit a second set of transmission parameters for the optical communication channel to the at least one optical network element, wherein the second set of transmission parameters are different than the first set of transmission parameters;
receive a second signal transmission over the optical communication channel from the at least one optical network element according to the second set of transmission parameters; and
determine a second quality of signal parameter associated with the second signal transmission, the first set of transmission parameters and the second set of transmission parameters are different from the first quality of signal parameters and the second quality of signal parameters.

16. The apparatus of claim 15, wherein the processor to further configured to:
determine whether the second quality of signal parameter is worse than the predetermined quality of signal value; and
upon determining that the second quality of signal parameter is not worse than the predetermined quality of signal value, transmit a third set of transmission parameters to the at least one optical network element, wherein the third set of transmission parameters are different than the first set of transmission parameters and the second set of transmission parameters.

17. The apparatus of claim 16, wherein the processor to further configured to:
upon determining that the second quality of signal parameter is worse than the predetermined quality of signal value, re-transmit the second set of transmission parameters to the at least one optical network element for subsequent signal transmissions over the optical communication channel.

18. The apparatus of claim 15, wherein the optical communication channel is associated with a fixed frequency; and wherein the second set of transmission parameters for the optical communication channel are configured to minimize an amount of bandwidth used on the optical communication channel.

19. The apparatus of claim 15, wherein the first set of transmission parameters are configured to provide a first bandwidth value for the optical communication channel; and wherein the second set of transmission parameters are configured to provide a second bandwidth value for the optical communication channel, wherein the second bandwidth value is larger than the first bandwidth value.

20. The apparatus of claim 15, wherein the first set of transmission parameters includes one or more of a baud rate value, a modulation type, and a forward error correction (FEC) overhead value; and wherein the predetermined quality of signal value is at least one of an optical signal-to-noise ratio (OSNR) value, a Q factor, a bit error rate (BER) value, or a generalized mutual information (GMI) value.

* * * * *